April 17, 1928.
C. L. NORMANDALE
1,666,297
TOP FOR MOTOR VEHICLES
Filed Sept. 28, 1925
3 Sheets-Sheet 1
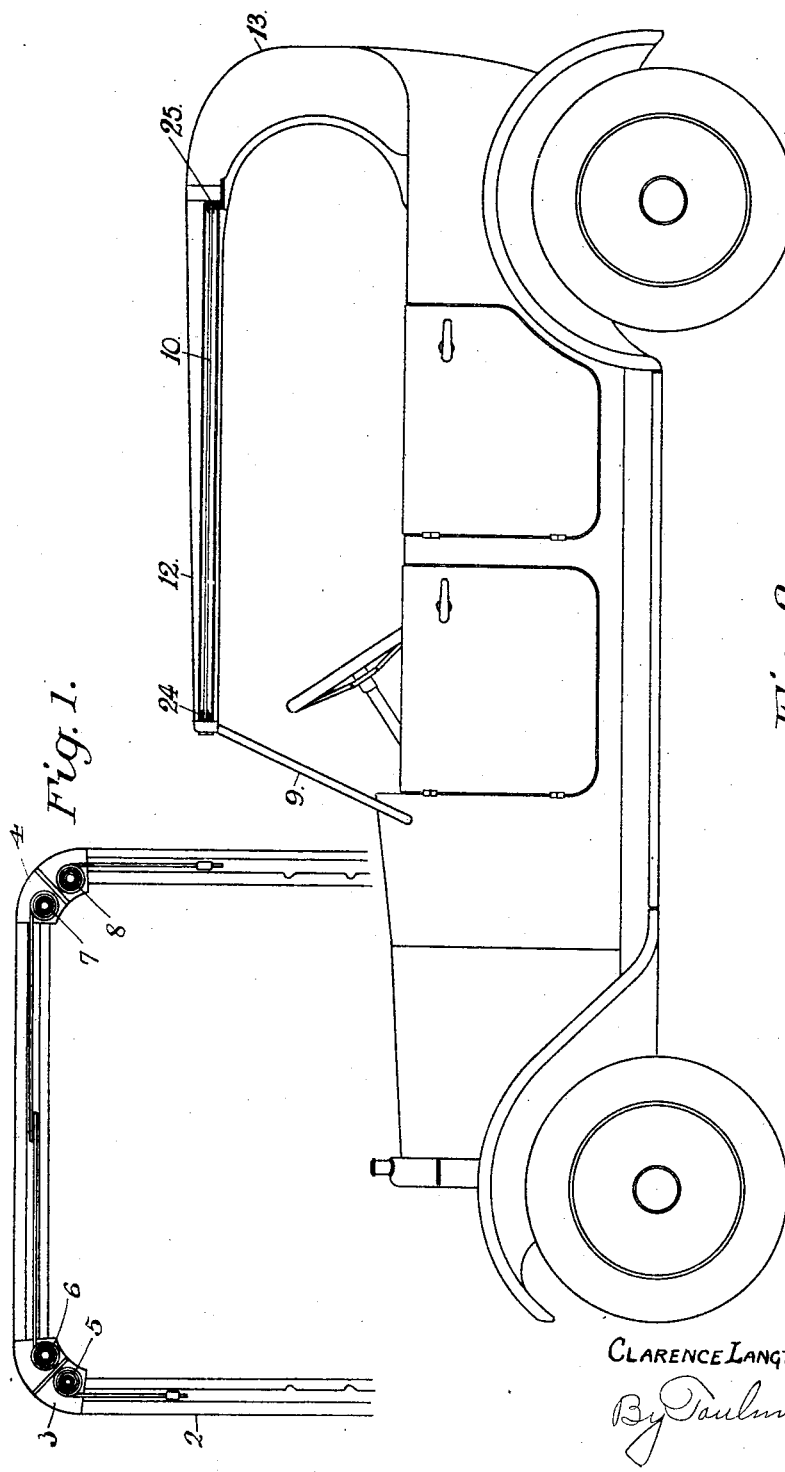
Inventor
CLARENCE LANGTON NORMANDALE,
By Toulmin & Toulmin,
Attorneys

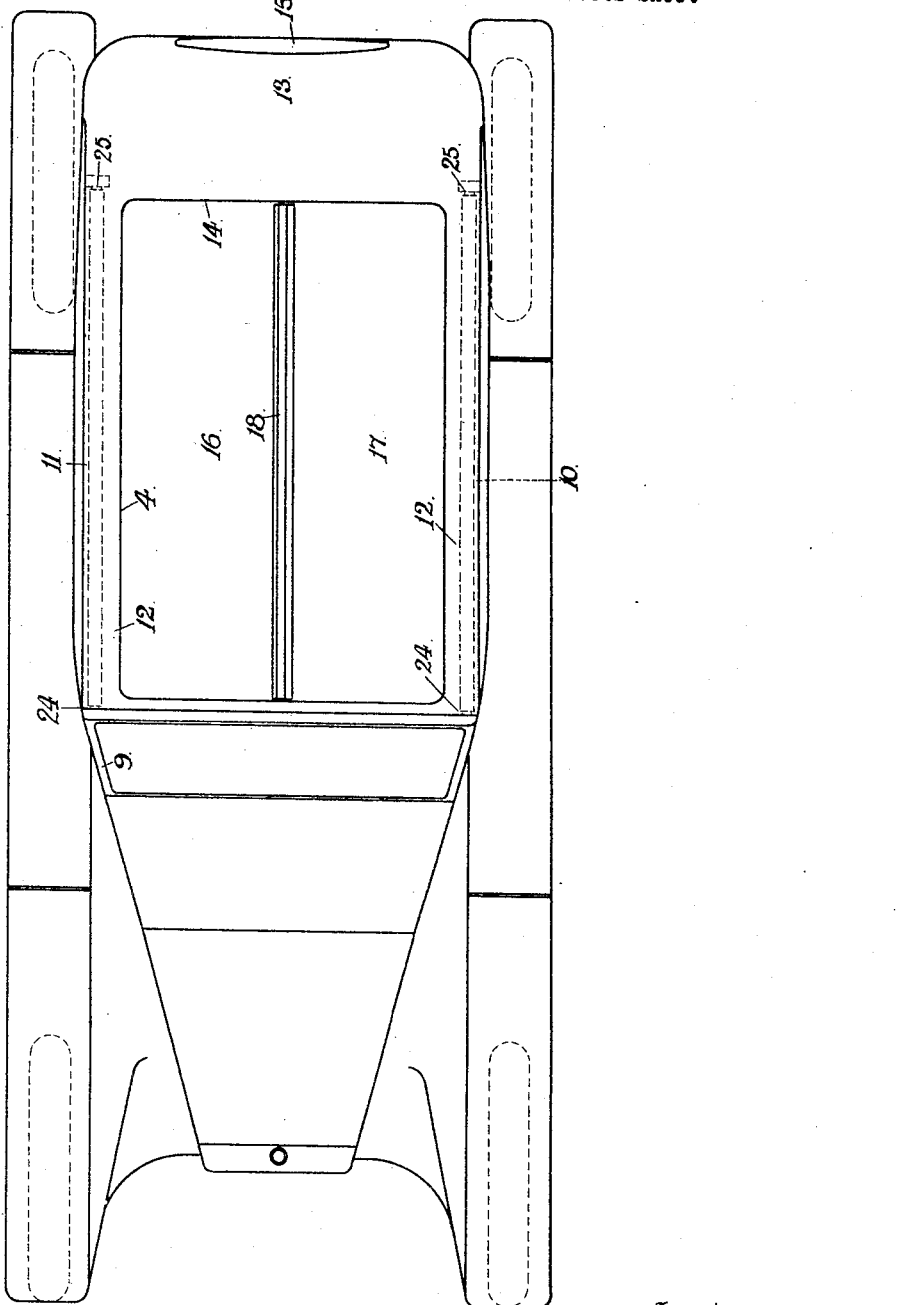

April 17, 1928.
C. L. NORMANDALE
TOP FOR MOTOR VEHICLES
Filed Sept. 28, 1925
1,666,297
3 Sheets-Sheet 3
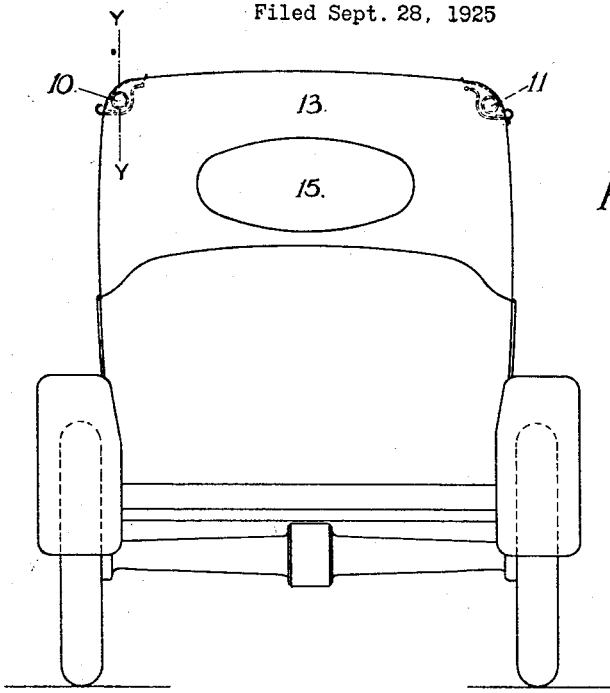
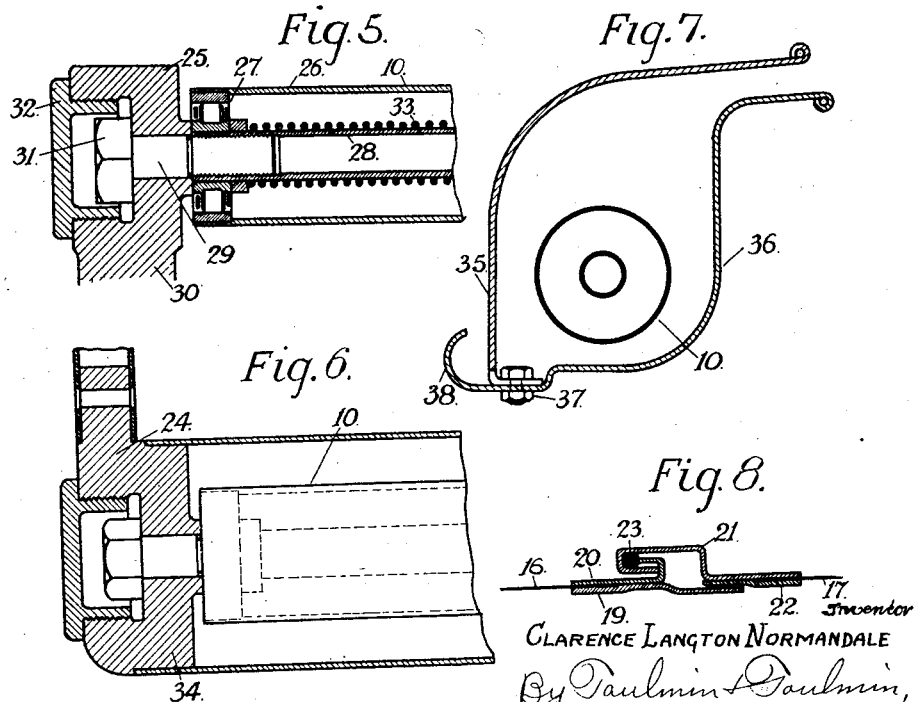
CLARENCE LANGTON NORMANDALE Patented Apr. 17, 1928.

1,666,297

UNITED STATES PATENT OFFICE.

CLARENCE LONGTON NORMANDALE, OF YEOVIL, ENGLAND.

TOP FOR MOTOR VEHICLES.

Application filed September 28, 1925, Serial No. 59,049, and in Great Britain November 5, 1924.

This invention relates to tops for motor vehicles of the roller blind type.

The object of this invention is to provide an improved top which shall be easier to manipulate.

A top for motor vehicles made in accordance with this invention comprises one or more roller blinds carried by a roller or rollers mounted on the vehicles with the axis or axes longitudinal thereto.

The said roller or rollers is or are mounted in detachable or fixed carriers, and the roller blind or blinds may have windows of celluloid or the like material formed integral therewith.

Means are provided for tensioning the roller blinds both longitudinally and laterally with respect thereto.

Referring to the accompanying drawings:

Fig. 1 is a sectional end elevation of one arrangement of top embodying the invention;

Fig. 2 is a side elevation of a car fitted with a slightly modified form of top made in accordance with this invention;

Fig. 3 is a plan of Fig. 2;

Fig. 4 is an end elevation viewed from the rear;

Fig. 5 is a detailed section of a portion of one of the roller blinds on line Y—Y in Fig. 4;

Fig. 6 is a detailed section of the forward end of one of the spring rollers;

Fig. 7 is an enlarged sectional view of the casing for holding the spring rollers; and Fig. 8 is a detailed view of the joint between the two roller blinds.

In Fig. 1 the supporting member 2 has a pair of double roller carriers 3 and 4 containing roller blinds 5, 6, 7 and 8. The roller blinds 6 and 7 can be pulled inwardly and joined together with a weatherproof lap joint in the middle.

The roller blinds 5 and 8 form side curtains in the known manner and contain the windows, and can be used either alone or in conjunction with the roof overhead.

The roller carrier, where detachable, may be arranged to lower into a space between the driver and passenger seats in the body.

The rollers may be operated by a handle and suitable gearing instead of being spring actuated.

Referring to Figs. 2, 3 and 4:

The car, which is fitted with a body of the usual four-seater type, has a sloping windscreen 9, and the rollers 10 and 11 are carried on a rigid framework 12 secured to the top of the windscreen 9 at its forward end and extending towards the back of the car where it is curved downwardly as at 13 to meet the back of the body. This rigid framework 12 is provided with a large rectangular opening 14 (Fig. 3) extending substantially the whole area of the roof, whereas the back part 13 is solid and is designed to enclose the whole rear of the car, with the exception of a window 15. The framework 12 and the back part 13 are preferably made of rigid material and are designed to be permanently erected.

The rollers 10 and 11 are mounted with their axes longitudinal to the vehicle, and are slightly longer than the rectangular opening 14. The rollers 10 and 11 carry blinds 16 and 17 which are adapted to be drawn across transversely of the vehicle, and meet in the middle at 18. A detail of the joint is shown in Fig. 8. The part 16 is clamped between two metal members 19 and 20, the latter being bent in the form of a hook to engage with the hook member 21, which holds the blind 17 between itself and another member 22. The hook member 21 is provided with a strip of rubber packing 23 in order to secure a watertight joint. The members 19 and 20 constitute a stiffener for the blind 16 and the members 21 and 22 constitute a stiffener for the blind 17. These stiffeners serve to tension the blinds laterally with respect thereto. The rollers 10 and 11 are mounted in bearings 24 at their front ends and in bearings 25 at their rear ends. A detail of the mounting at their rear ends is shown in Fig. 5 and at their forward ends in Fig. 6.

Referring to Fig. 5: 10 is the roller which comprises an outer cylindrical member 26 mounted on roller bearings 27 on a fixed tubular member 28, provided with a solid spigot 29 bolted into the framework 30 by a nut 31. In order to give the whole a neat appearance, the recess in the framework 30 is enclosed by an end cap 32. The rollers 10 and 11 are spring operated by means of a long helical spring 33 disposed between the tubes 26 and 28.

Referring to Fig. 6: The roller 10 is mounted on the framework 34 in a similar manner to that described above. In order to provide a waterproof joint, the rollers 10 are carried in a sheet metal casing comprising two complementary parts 35 and 36 as shown in Fig. 7. The parts 35 and 36 are bolted together by a series of bolts, one of which is shown at 37, and the part 36 is provided with a lip or channel 38 to catch the water running off the roof. The two parts at the top are shaped to form a fair-lead for the roller blinds and have their edges rounded over as shown to prevent damage to the material.

In operation, when it is desired to erect the top, the driver or passenger can pull the two roller blinds 16 and 17 inwardly together, without leaving their seats. The two edges of the blinds are hooked together, as shown in Fig. 8, thereby forming a water-tight joint.

The action of drawing the blinds together winds up the springs in the roller and thereby keeps the blinds tensioned longitudinally with respect thereto. On unhooking the joint in the middle, the springs in the roller wind up the blinds.

If desired the roller blinds may be combined with side curtains or windows of any type, that is to say, these may be of the rigid type and not necessarily of the known roller type.

A top made in accordance with this invention can be easily erected and lowered and is extremely efficient in use, and is equally adaptable to open touring or closed saloon types of cars.

What I claim and desire to secure by Letters Patent is:—

1. In a motor vehicle, a top structure having a rigid closed-in back portion and an opening in the upper portion, said top at its forward end being permanently secured to and supported by the wind screen of the vehicle, roller blinds disposed longitudinally of the top adjacent said opening and adapted to be drawn inwardly and transversely to close the opening, a housing for each blind, and automatic interlocking members carried by said blinds for maintaining them in closing position.

2. In a motor vehicle, a top structure having a rigid closed-in back portion and an opening in the upper portion, said top at its forward end being permanently secured to and supported by the wind screen of the vehicle, roller blinds disposed longitudinally of the top adjacent said opening and adapted to be drawn inwardly and transversely to close the opening, a housing for each blind, automatic interlocking members carried by said blinds for maintaining them in closing position, and means for automatically returning the blinds to rolled position when the interlocking members are disengaged.

3. In a motor vehicle, a top structure having a rigid closed-in back portion and an opening in the upper portion, said top at its forward end being permanently secured to and supported by the wind screen of the vehicle, roller blinds disposed longitudinally of the top adjacent said opening and adapted to be drawn inwardly and transversely to close the opening, a housing for each blind, and means for maintaining the blinds in closing position comprising a hook-shaped metallic member secured to the edge of each blind and adapted to interlock, and a packing adapted to be gripped by metallic members and provide a water-tight joint.

4. In a motor vehicle, a permanent top structure having a rigid closed-in back and an opening in the upper portion, roller blinds disposed longitudinally of the motor vehicle, one on each side of the top and adapted to be drawn toward each other to close the opening, a housing for each blind when rolled, and automatic interlocking means carried by said blinds to form a water-tight self-locking closure when the blinds are in closing position, said interlocking means being rigid and forming the only center support of the closure.

In testimony whereof I affix my signature.

CLARENCE LONGTON NORMANDALE.